Patented May 2, 1939

2,156,821

UNITED STATES PATENT OFFICE 2,156,821

DERIVATIVES OF α-HYDROXYNAPHTHOIC ACID

Wilhelm Schneider, Dessau, Anhalt, Germany, assignor to Agfa Ansco Corporation, Binghamton, N. Y., a corporation of New York No Drawing. Application August 26, 1937, Serial No. 161,057. In Germany September 12, 1936

11 Claims. (Cl. 260—559)

This invention relates to new derivatives of α-hydroxynaphthoic acid.

One of its objects is to provide a process of producing these new derivatives. Another object are new dyestuff components for use in photographic layers for color photography. Further objects will appear from the following detailed specification.

According to this invention valuable derivatives of α-hydroxynaphthoic acid are made by causing an α-hydoxynaphthoic acid halide, especially the chloride, to react with a colorless or slightly colored amino compound containing a substantive group. The reaction is advantageously conducted in the presence of a solvent as condensing agent.

The following are examples of suitable colorless or slightly colored amino compounds containing substantive groups: benzidine and its homologues, 4, 4'-diaminostilbene and its homologues, 4,4'-diaminoazoxybenzene and its homologues, diaminodiaryl ureas, di-(aminobenzoyl-4,4'-aminophenyl)-urea, aminobenzthiazoles, dehydrothiotolidine, aminoazaphenanthrenes, 3,6-diaminocarbazole and similar compounds.

The α-hydroxynaphthoic acid derivatives obtainable by the invention are suitable as dyestuff components for use in photographic layers for color photography, since they do not diffuse out of photographic layers, particularly gelatin layers.

The following examples illustrate the invention:

(1) 1 gram mol of benzidine is dissolved in 1 litre of pyridine and 2 gram mols of α-hydroxynaphthoic acid chloride are added to the solution at a temperature of 70° C. The product formed is precipitated by dilution with ice and water and acidification and is purified by boiling with methanol. There is obtained a yellowish green product which is soluble in dilute caustic alkali solutions; these solutions can be added without difficulty to photographic emulsions. The produced compound corresponds with the following formula:

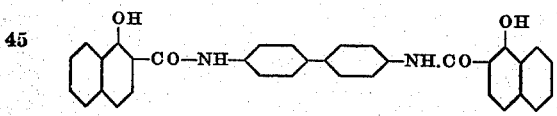

(2) 1 mol of 3,3'-4,4'-tolidine and 2 mols of α-hydroxynaphthoic acid chloride are caused to react in the manner described in Example 1 and the product is precipitated and purified as therein described. It has the following formula:

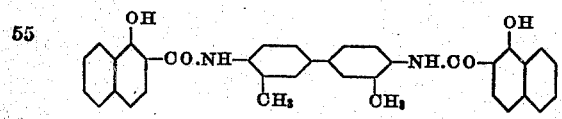

(3) 1 mol of 3,3'-dichlorobenzidine and 2 mols of α-hydroxynapthhoic acid chloride are caused to react in the manner described in Example 1. The product thus obtained corresponds to the following formula:

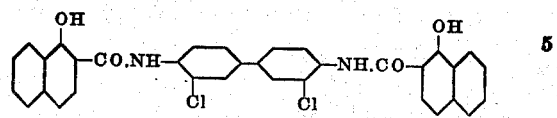

(4) 1 mol of 3,6-diaminocarbazole and 2 mols of α-hydroxynaphthoic acid chloride are caused to react in the manner described in Example 1. The produced compound has the following formula:

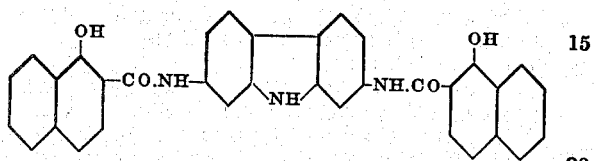

(5) 1 mol of 3,3'-benzidinedicarboxylic acid and 2 mols of α-hydroxynaphthoic acid chloride are caused to react in the manner described in Example 1. The obtained product has the following formula:

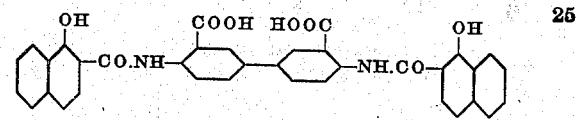

(6) 1 mol of Diazo Light Yellow 2 G (the urea from diaminodibenzoylaminoaniline sulfonic acid) and 2 mols of α-hydroxynaphthoic acid chloride are caused to react in the manner described in Example 1. The obtained product has the following formula:

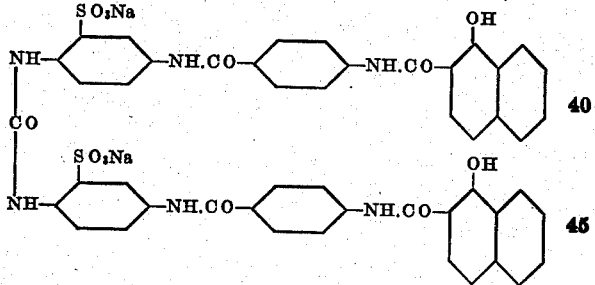

(7) 1 mol of diaminobenzoylaminostilbene-3, 3'-disulfonic acid and 2 mols of α-hydroxynaphthoic acid chloride are caused to react in the manner described in Example 1. The product thus obtained corresponds with the following formula:

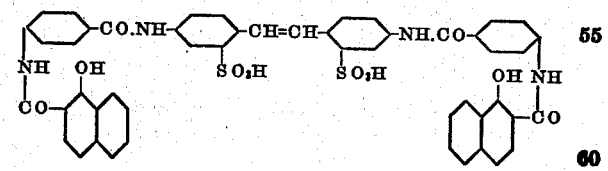

(8) 1 gram mol of 10-amino-4-azaphenanthrene and 1 gram mol of α-hydroxynaphthoic acid chloride are caused to react in 1 litre of pyridine at 180° C. and the pyridine is then removed by means of ice and hydrochloric acid. The product is dried and sulfonated by means of sulfuric acid containing 15 per cent of oleum. The sulfonation product is precipitated by pouring the reaction mixture on to ice. It corresponds with the following formula:

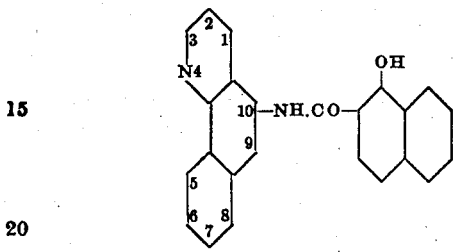

What I claim is:

1. The process which comprises acting upon α-hydroxynaphthoic acid chloride with an amino compound containing in its molecule a substantive group.

2. The process which comprises acting while heating upon α-hydroxynaphthoic acid chloride with an amino compound containing in its molecule a substantive group.

3. The process which comprises acting while heating upon α-hydroxynaphthoic acid chloride with an amino compound containing in its molecule a substantive group in the presence of a condensing agent.

4. The process which comprises acting while heating upon α-hydroxynaphthoic acid chloride with an amino compound containing in its molecule a substantive group in the presence of pyridine.

5. The process which comprises acting while heating upon 2 mols of α-hydroxynaphthoic acid chloride with 1 mol of benzidine dissolved in pyridine and precipitating the product thus formed by dilution with ice and water and acidification.

6. The process which comprises acting while heating upon 2 mols of α-hydroxynaphthoic acid chloride with 1 mol of 3,3'-4,4'-tolidine dissolved in pyridine and precipitating the product thus formed by dilution with ice and water and acidification.

7. The process which comprises acting while heating upon 2 mols of α-hydroxynaphthoic acid chloride with 1 mol of 3,3'-benzidinedicarboxylic acid dissolved in pyridine and precipitating the product thus formed by dilution with ice and water and acidification.

8. The compound corresponding with the formula:

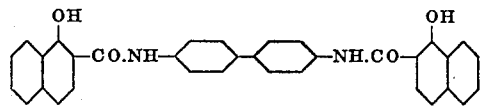

9. The compound corresponding with the formula:

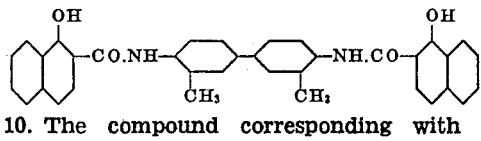

10. The compound corresponding with the formula:

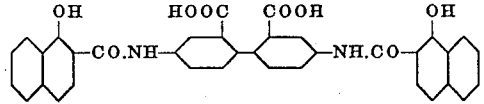

11. An acid amide of α-hydroxynaphthoic acid in which the amide group is linked to a substantive radical.

WILHELM SCHNEIDER.